United States Patent [19]

Videc

[11] 4,318,957

[45] Mar. 9, 1982

[54] CARRIER FOIL FOR A MAGNETIC RECORDING TAPE, AND METHOD OF MANUFACTURING SAME

[75] Inventor: Bernard P. Videc, Eindhoven, Netherlands

[73] Assignee: U.S. Philips Corporation, New York, N.Y.

[21] Appl. No.: 973,274

[22] Filed: Dec. 26, 1978

[30] Foreign Application Priority Data

Jan. 5, 1978 [NL] Netherlands ............... 7800122

[51] Int. Cl.$^3$ ............................................. G11B 5/62
[52] U.S. Cl. .................................. 428/295; 360/134; 427/129; 428/474.4; 428/480; 428/694; 428/695; 428/900; 428/910
[58] Field of Search ............... 428/910, 294, 692, 694, 428/695, 474.4, 411, 295, 480, 900; 427/129; 264/210.7; 360/134

[56] References Cited

U.S. PATENT DOCUMENTS

| | | | |
|---|---|---|---|
| 3,320,083 | 5/1967 | Rusch, Jr. ............... | 428/251 |
| 3,432,591 | 3/1969 | Heffelfinger ............. | 428/483 |
| 3,901,851 | 8/1975 | Kohno et al. ............ | 428/910 |
| 3,937,754 | 2/1976 | Shimotsuma et al. .... | 264/210.7 |
| 4,041,202 | 8/1977 | Williams .................. | 428/294 |

FOREIGN PATENT DOCUMENTS

| | | | |
|---|---|---|---|
| 48-20874 | of 1973 | Japan ...................... | 264/210.7 |
| 1433344 | 4/1976 | United Kingdom ...... | 428/910 |
| 1441304 | 6/1976 | United Kingdom ...... | 264/210.7 |

*Primary Examiner*—Stanley S. Silverman
*Attorney, Agent, or Firm*—Norman N. Spain

[57] ABSTRACT

The invention provides a carrier foil for magnetic recording tapes composed of a thermoplastic synthetic resin, which foils have been manufactured so that the stiffness (elasticity modulus) $E_1$ in the longitudinal direction of the foil is at least 4000 N/mm$^2$ and the stiffness (elasticity modulus) in the transverse direction of the foil is at least 1.3 $E_1$. These carrier foils are more suitable for very thin magnetic tapes and are more resistant against defects such as buckling, folding, wrinkling and cupping than known carrier foils for record carriers having a comparable stiffness, but in which the stiffness distribution is different.

3 Claims, No Drawings

CARRIER FOIL FOR A MAGNETIC RECORDING TAPE, AND METHOD OF MANUFACTURING SAME

The invention relates to a carrier foil for a magnetic recording tape composed of a thermoplastic synthetic resin and to a method of manufacturing such foils.

Synthetic resin foils, such as highly-polymerized polyester foils, manufactured for example, from polyethylene terephthalate or from a polyamide, generally have a good strength, stiffness, resistance to detrition and can withstand heat which makes them suitable as carriers for magnetic recording tapes. Initially it was usual to stretch said foils in the directions of width and length to an equal extent so as to obtain a so-called balanced tape having the same stiffness in both directions. In order to be able to cope with the demand for thinner and thinner carrier foils having nevertheless a sufficiently high tensile strength, it has been the vogue since 1958 to stretch balanced foils an additional time in the longitudinal direction (so-called tensilized tape), so that these foils have their largest stiffness in the longitudinal direction. Recording tapes which use this latter type of foil are disclosed in German Offenlegungsschrift No. 1,404,396.

These known magnetic recording tapes are obtained by pre-stretching the polyester foil (which is used as a carrier for the magnetizable layer and has a thickness of 17 $\mu$m), first in the transverse direction and in the longitudinal direction to an equal extent with a stretching ratio of 2.5 to approximately 3.25 and then post-stretching them 30 to 50% or more in the longitudinal direction. The post-stretched and hardened foil is then coated with a magnetizable layer.

If even thinner foils are to be made, mainly foils having a thickness between 5 and 15$\mu$m, it is found that in spite of the extra pre-stretching in the longitudinal direction as described above, an increasing number of undesired effects occur during tape transport, including curling of the edges of the tape and even buckling or folding against the height guiding means; and wrinkling of the tape during tape transport both in the recording and display apparatus and during the manufacture of the tape in production machines, which wrinkles may cause stress concentrations, pleats and a poor contact with a magnetic head co-operating with the tape.

It is the object of the invention to provide a carrier foil for a magnetic recording tape which may be very thin and is less liable to form curls, buckles or wrinkles during use of tensilized tapes.

A carrier foil for a magnetic recording tape according to the invention is characterized in that the foil in the longitudinal direction has a Young's modulus $E_l$ of at most 4000 N/mm$^2$ and has a Young's modulus of at least 1.3 $E_l$ in the transverse direction.

The Young's modulus (elasticity modulus) of the foil is a measure of the stiffness and is determined according to the standard method defined in ASTM D 882-73, method A.

By distributing the available stiffness of the carrier foil intentionally differently from what has been usual so far, namely providing a comparatively large stiffness in the transverse direction and a comparatively small stiffness in the longitudinal direction, it was unexpectedly found during the investigations which led to the present invention that with a given stiffness, the tendency of the foil to buckle, curl, fold or wrinkle during the tape transport was considerably reduced. It was further found that the so-called cupping of the foil was reduced, since the stiffnesses of the carrier foil and of the magnetisable coating of a transversally stiff tape are better matched to each other than those of a longitudinally stiff tape. An important aspect of the invention is that investigation have demonstrated that the carrier foil need not at all be so stiff in the longitudinal direction. A Young's modulus of as low as 2000 N/mm$^2$ is in the longitudinal direction sufficient, provided that the stiffness in the transverse direction is sufficiently large (preferably at least 4000 N/mm$^2$).

A magnetic recording tape carrier foil according to the invention can be manufactured in several ways.

One embodiment of a method of manufacturing a carrier foil according to the invention, is characterized in that the unstretched foil is stretched both in the longitudinal direction and in the transverse direction in circumstances which satisfy the following condition:

$$T \leq 1.5 \, L$$

wherein L is the stretching ratio in the longitudinal direction relative to the original length of the unstretched foil, and T is the stretching ratio in the transverse direction relative to the original width of the original foil.

An alternative preferred embodiment of a method of manufacturing a carrier foil according to the invention, is characterized in that the foil is provided with fibres extending in the transverse direction. These fibres may consist, for example of glass or of a synthetic resin. This method of increasing the stiffness of the foil in the transverse direction makes it possible to produce any desired stiffness.

The invention also relates to a magnetic recording tape comprising an elongate synthetic foil which has a magnetizable coating and which is characterized in that the foil is composed of the above-described carrier foil.

Some embodiments of the invention will now be described with reference to the following Examples. Details of tensilized carriers are included for comparative purposes.

EXAMPLES

The properties of 7.5$\mu$m thick carrier foils in tape recorders was examined. An elongate transversally stiff foil according to the invention having a width of 12.7 mm and a stiffness in the longitudinal direction $E_l = 4000$ N/mm$^2$ and a stiffness in the transverse direction $E_t = 8000$ N/mm$^2$, was compared with the behaviour of tensilized foil (outside the scope of the invention) with $E_l = 8000$ N/mm$^2$ and $E_t = 4000$ N/mm$^2$. It was found that transversal stiff foil had a significantly smaller tendency to buckle or fold the edges against the height guiding means than the tensilized foil.

The tendency to wrinkle of said two types of foil in the proximity of the capstan and rubber pressure roller has also been compared. It is known that thin foil will start pleating and wrinkling if the pressure roller presses the foil non-uniformly against the capstan and the foil tensioning force becomes too large. it has been found that the transversal stiff foil only shows a tendency to wrinkle in the proximity of the capstan at a tensioning force which is at least 50% higher than the tensioning force at which tensilized foil starts wrinkling.

Although the breaking strength of the known tensilized tape, under a purely tensile load (in laboratory experiments) in the longitudinal direction, is larger than the breaking strength of transversally stiff tape, it has been found that when used in tape recorders under high shock loads which occur when tape transport is started, the transversally stiff types of the invention do not break faster than tensilized tape. This result, which could not be expected, can be explained partly by the fact that tape in recorders does not break in most of the cases because the permissible tensioning force is exceeded, but because local stress concentrations which occur in the tape, for example near height guiding means, are too high. By choosing the largest stiffness to be in the transverse direction, the intensity of the stress concentrations will become lower rather than higher.

It has proved to be particularly difficult to collect quantitative data on the buckling and wrinkling behaviour of the foils to complete the above-mentioned qualitative indications. This is feasible if it is considered that in thin foils thickness variations of ±5% (and hence bending stiffness variations of ±15%) have to be taken into account, that tensioning force variations which are larger than or equal to 0.05 N have to be taken into account, that the winding and unwinding reels introduce considerable disturbances in the foil, and that measuring instruments will influence the measurements on the very thin foils.

In order to obtain data on the wrinkling sensitivity of foils according to the invention, the following experiment was carried out.

Test pieces of different stiffnesses were clamped at both ends and were subjected to a tensile force in such a manner that no moment or transverse force was generated in the test pieces.

One end of each test piece was then given a transverse displacement whereas the other end was maintained in its original position.

The critical transverse displacement $V_r$, that is the transverse displacement at which the tape starts wrinkling, is given in the Table.

All the test pieces had a length of 30 mm, a width of 12.77 mm and a thickness of 0.012 mm. Tensioning forces of 0.5 N and 1.2 N were used.

In the following Table, the stiffness of the test pieces is indicated by the elasticity modulus in the longitudinal direction $E_l$ and the elasticity modulus in the transverse direction $E_t$.

In addition, the Table records the value of the anisotrophy coefficient $\delta$ which for the known tensilized foils is defined as $E_l = \delta E$, $E_t = E$, and for transversally stiff foils according to the invention, as $E_l = E$, $E_t = \delta E$. The following results were obtained.

|  | | tensioning force (N) | | 0.5 | 1.2 |
|---|---|---|---|---|---|
|  | $\delta$ | $E_l$ (N/mm²) | $E_t$ (N/mm²) | $V_r$ (μm) | $V_r$ (μm) |
| Transversally stiff tape | 1.9 | 3800 | 7200 | — | 70 |
|  | 1.65 | 3800 | 6300 | 32 | 64 |
|  | 1.2 | 3800 | 4600 | — | 58 |
| Tensilized tape | 1.2 | 4600 | 3800 | — | 53 |
|  | 1.65 | 6300 | 3800 | 20 | 38 |
|  | 1.9 | 7200 | 3800 | — | 36 |

The great advantage of transversally stiff foil according to the invention compared with the so far usual tensilized or longitudinally stiff foil will be obvious from these results.

When two foils having a given total stiffness (having a given δ) are compared with each other, the foil having the largest stiffness in the transverse direction always gives a better result than the foil having the largest stiffness in the longitudinal direction both at tensioning forces of 0.5 N and 1.2 N, that is to say with a foil having the largest stiffness in the transverse direction, a larger transverse displacement is possible before wrinkling occurs.

If the stiffness in one direction is 20% alarger than in the other direction (δ=1.2), the resistance to wrinkling of the foil having the largest stiffness in the transverse direction appears to be approximately 10% larger than that of a foil having the largest stiffness in the longitudinal direction. If the stiffness difference is 65% (δ=1:65) the resistance to wrinkling of the foil according to the invention is nearly 70% larger than that of a similar tensilized foil. All these results are obtained with a foil having a stiffness in the longitudinal direction which is small in itself (3800 N/mm²).

What is claimed is:

1. A magnetic recording tape carrier foil comprising a thermoplastic synthetic resin foil bearing a magnetizable coating, characterized in that in the longitudinal direction the foil has a Young's modulus $E_l$ of at most 4000 N/mm² and in the transverse direction the foil has a Young's modulus of at least 1.3 $E_l$.

2. A carrier foil as claimed in claim 1, characterized in that in the transverse direction the foil has a Young's modulus of at least 1.65 $E_l$.

3. The carrier foil of claim 1 provided with fibers extending in the transverse direction.

* * * * *